Jan. 1, 1963     J. K. WILDEN     3,071,118
ACTUATOR VALVE MEANS
Filed May 3, 1960
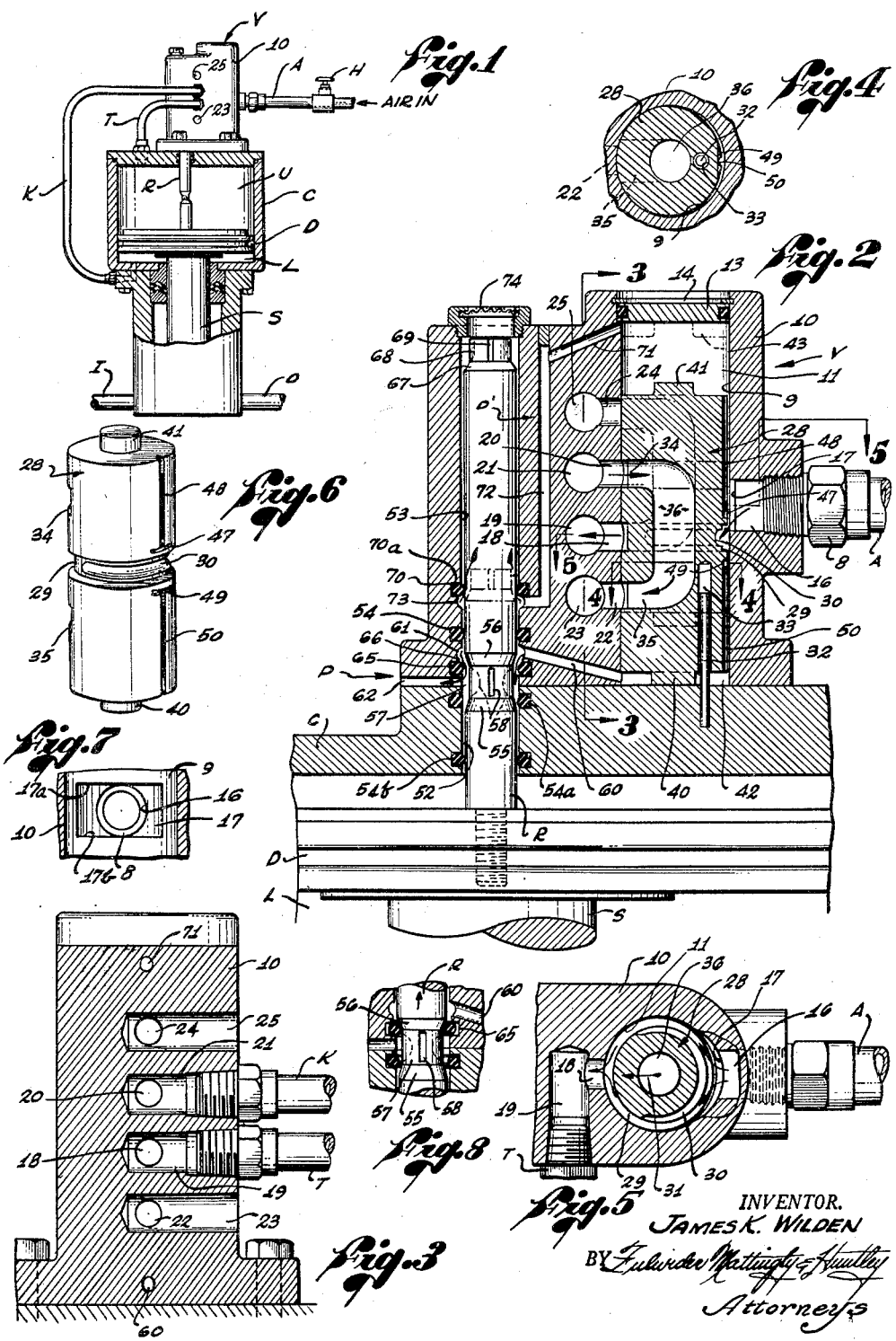
INVENTOR.
JAMES K. WILDEN

United States Patent Office 3,071,118
Patented Jan. 1, 1963

3,071,118
ACTUATOR VALVE MEANS
James K. Wilden, 12594 Michigan Ave., Colton, Calif.
Filed May 3, 1960, Ser. No. 26,520
14 Claims. (Cl. 121—157)

This invention relates generally to actuator valves and more particularly to pilot operated actuator valves, which supply drive fluid to work devices.

Embodiments of the present invention are most widely used in pneumatically driven diaphragm and piston pumps. Both types of apparatus are operated by alternately pressurizing and venting two drive chambers, which are thus alternately expanded and contracted to perform the work. To this end, there is provided an actuator valve having a slidable member, which shifts at the proper time to direct the drive fluid flow, as required to move the device through its work strokes.

A principal mode of shifting the actuator valve is by using part of the drive fluid to accomplish the required movement, i.e., a pilot operated valve.

In prior valves of this type, I have provided a valve piston in a vertical cylinder, there being passages such that, with the piston in the lower operating position, one of the drive chambers was pressurized, while the other drive chamber was vented; the converse occurring when the piston was in the upper operating position. I provided clearance between it and the cylinder wall, so that air accumulated in chambers at the respective ends of the piston. Then, by venting these chambers alternately, the piston was shifted back and forth by expansion of the air in the respective unvented chamber.

Pilot operated actuator valves in general, as well as my above described valve, have experienced two difficulties, among others, which the present invention overcomes. When the work device was operating under a very small load, the pneumatic pressure which was supplied was correspondingly low and the piston tended to "stick" halfway between its two operating positions. To overcome this difficulty, a valve piston of the present invention is provided with means, which will supply additional drive fluid to the unvented chamber after the piston has been shifted more than halfway to the next operating position.

Another important feature of the present invention is that it uses the supplied drive fluid in such manner, as to cause the piston to be urged against the passage port side of the cylinder wall. This has the advantage that it provides a good seal around the ports. Further, it advantageously results that, when the piston is in the upper operating position, the increased friction between the piston and the cylinder wall will better tend to hold the piston in the upper position. This is advantageous since, when the supply pressure of the drive fluid is low, the force of gravity on the piston sometimes is greater than the force of the pressure in the chamber below the piston.

With the foregoing in mind, it is a major object of this invention to provide a unique slide member for an actuator valve.

It is a further object of this invention to provide an improved actuator valve.

A still further object of this invention is to provide for a pneumatic work device an actuator valve of increased reliability.

It is another object of this invention to provide a pneumatically positioned actuator valve having an improved means for shifting the slide member in the valve.

It is still another object of this invention to provide a pilot operated actuator valve which, over a wide range of supply pressure, will shift correctly at the proper times to redirect drive fluid flow.

A still further object of this invention is to provide an inexpensive valve piston for directing fluid flow between ports of a valve and which uses that fluid flow to urge the piston into sealing relation about the ports.

Other and further objects of this invention will become apparent in the detailed discussion below in conjunction with the attached drawings wherein:

FIGURE 1 is a partially cut away view of a valve of the present invention in association with a representative work device.

FIGURE 2 is a vertical, medial cross section view of the valve in FIGURE 1, but with certain valve parts in changed position.

FIGURE 3 is a cross sectional view of the valve taken along line 3—3 in FIGURE 2.

FIGURE 4 is a fragmentary cross sectional view of the valve piston taken along line 4—4 in FIGURE 2.

FIGURE 5 is a cross sectional view taken on line 5—5 in FIGURE 2.

FIGURE 6 is a perspective view of the valve piston shown in FIGURE 2.

FIGURE 7 is a fragmentary view of the pressurized fluid inlet, as seen from within the cylinder.

FIGURE 8 is a fragmentary view of the vent control, shown in FIGURE 2, but with the parts in changed relative positions.

Referring now to FIGURE 1, an actuator valve V is located on top of casing C of a piston-type work device. In this device, fluid is pumped from inlet pipe I to outlet pipe O by reciprocation of the pump piston rod S. Located within the casing C and attached to the upper end of the piston rod S is a double acting drive piston D, which effectively divides the casing into an upper drive chamber U and a lower drive chamber L.

With this arrangement, the piston rod S may be reciprocated through its work stroke by pressurizing and venting the chambers L and U alternately. To this end, drive fluid, which in this case is compressed air, is supplied to the actuator valve V through air supply pipe A at a rate and pressure, which is controlled by hand valve H. Then, as explained below, the actuator valve V causes the air to flow to and from the chambers L and U through conduits K and T, respectively, in response to the position and movement of control rod R attached to piston D.

Referring now to FIGURES 2 through 7, the preferred embodiment of the actuator valve V will be described in further detail. Housing 10 has a vertical bore or cylinder 11, defined by cylinder wall 9. The cylinder 11 is closed at its lower end by the casing C and at its upper end by a packed-off disk 13, held in place by snap ring 14. Inlet passage 16 in the housing 10 is in communication through nipple 8 with air supply pipe A, and opens to cylinder 11 by way of inlet port 17. Inlet port 17 is in the nature of a recess in the wall 9, which recess is arcuate, as viewed in the aspect of FIGURE 5, and preferably extending laterally about 30° beyond the opposite sides of passage 16, where the latter opens to the recess. As viewed in FIGURE 7, the recess 17 is rectangular with upper and lower defining faces 17a and 17b, respectively, preferably extending at right angles with respect to the vertical axis of cylinder 11. As will later appear, the ascribed characteristics of recess 17 promote efficiency of fluid flow and permit advantageous cooperation with other valve parts.

Angularly spaced from the ends of inlet recess 17, as viewed in plan, are first and second delivery ports 18 and 20, and lower and upper exhaust ports 22 and 24, which ports are provided in the cylinder wall 9, as viewed in FIGURE 3, are vertically aligned. The ports individually open to cylinder 11, except when selectively blanked by a slide or piston to be described. In the illustrated embodiment, the pairs of ports, on the one hand, and recess 17, on the other hand, are at diametrically opposite sides of cylinder 11, and the elements associated with the ports and recess will be described on that basis of relative location. However, this choice of showing and description is not to be considered as limitation on the broader aspects of the invention and claims.

The first delivery port 18 communicates with conduit T through lateral passages 19 to conduct compressed air to and from upper drive chamber U. The second delivery port 20 communicates with conduit K through lateral passage 21 to conduct compressed air to and from the lower drive chamber L. The lower exhaust port 22, via lateral passage 23, communicates with the atmosphere for the purpose of venting the lower drive chamber L in a manner to be described below. Similarly, an upper exhaust port 24 communicates with the atmosphere via lateral passage 25 for the purpose of venting air in the upper drive chamber U.

For the purpose of selectively directing the flow of air to the proper ports 18, 20, 22, and 24, a valve piston or slide 28 is arranged for vertical reciprocation within the cylinder 11. As illustrated in FIGURES 2, 5, and 6, the piston 28 has a circumferential recess 29, which is so located that air may pass from inlet 16 through the inlet port 17 and around the recess 29 to the first delivery port 18, when piston 28 is in the lower opertaing position shown. Similarly, when the piston 28 is in the upper operating position (shown in phantom lines), air will pass from the inlet 16 and the inlet port 17 to the second delivery port 20.

The piston 28 is held against appreciable rotation by a vertical register pin 32 carried stationarily by casing C and received with free sliding fit in bore 33 provided in the lower end of the piston 28.

A sub-channel 30 is produced at the bottom of recess 29 and extends approximately 240° thereof, whereby the portion of the passage on the right side of the piston 28 facing the inlet 17 is of greater volumetric capacity, than is the portion which faces the ports 18 and 20. The shape of recess 17 has the effect of increasing the differential between the volumetric capacity at opposite sides of the piston 28. When the supplied air pressure is low, the flow through the recess 29 is subsonic. Therefore, the "venturi section" thus formed and facing the delivery ports 18 and 20, reduces the static pressure on the left side of the piston causing a resulting effective force to the left (indicated by arrow 31), which urges the piston 28 against the wall 9 at the left side of the cylinder 11.

The above described unique shape of the passage formed by the recess 29 and sub-channel 30 has several benefits. First, the force 31 pushes the piston 28 securely against the side of the cylinder wall 9 through which the ports 18, 20, 22, and 24 open, forming a better seal around said ports, when the piston 28 is in either its lower or its upper operating position. Further, when the piston 28 is in its upper operating position, the increased friction between the left side of the piston 28 and the cylinder wall 9 will aid in holding the piston in said upper portion.

It should be noted that no air passes through the recess 29 during a portion of the travel of the piston between its operating positions; and during this period of travel, there is little friction wear, because the piston 28 is not urged against the wall by force 31.

Formed within the piston 28 is an upper opening 34 and a lower opening 35, which openings extend radially and are connected by longitudinal passageway 36. These openings and the passageway are used in selectively venting the drive chambers L and U. More particularly, as illustrated in FIGURE 2 by the arrows, air which is being vented from the lower drive chamber L, passes from port 20 through passageway 36 to exhaust port 22 and thence to atmosphere. Similarly, when the piston 28 is in its upper operating position, air passes from the upper drive chamber U through port 18 to exhaust port 24, and thence to the atmosphere.

Having described the manner in which piston 28 in its lower and upper operating positions directs the flow of compressed air, I will now turn to the description of the features of the present valve, by which the piston 28 is shifted between these operating positions.

For this purpose, I provide means whereby, when the piston is at the end of its stroke in either direction, there still remains an effective portion of open cylinder between the end of the piston, which faces in the direction of last piston movement, and the opening end wall of the cylinder. Said means comprises a lower spacer 40 formed on the lower end of piston 28, and an upper spacer 41 formed on the upper end of the piston.

When the piston 28 is at the lower end of its stroke (full lines in FIGURE 2), spacer 40 engages casing C, which closes the lower end of cylinder 11, and there is thus defined an annular cylinder chamber 42, which I will term as the lower shift chamber. Similarly, when the piston 28 is at the upper end of its stroke (phantom lines in FIGURE 2), spacer 41 engages disk 13, which closes the upper end of cylinder 11, and there is thus effectively defined an upper shift chamber 43. The spacers are of such effective length that the shift chambers individually have sufficient volume to perform the piston shifting function, which will be described.

Air is supplied in two ways to the cylinder 11 at opposite ends of the piston. First, as illustrated in FIGURES 2 and 4, the piston 28 is of sufficiently smaller diameter than cylinder 11 to permit the constant leakage of compressed air from inlet 16 past the piston to the open cylinder beyond the ends of the piston 28, including the particular shift chamber 42 or 43, which is presently effective. Then, when air is vented from the end of the cylinder opposite that at which the effective shift chamber is defined, the accumulated air in the effective shift chamber expands and thus thrusts the piston 28 toward its opposite operating position.

Thus, when the piston 28 is in the full line position of FIGURE 2, compressed air from inlet 16 leaks past the piston 28 into the open cylinder above the piston 28 and into shift chamber 42. Then, by venting the cylinder above the piston, the compressed air within the shift chamber 42 thrusts the piston 28 upwardly toward its opposite operating position. When the piston reaches that position (phantom lines in FIGURE 2), the shift chamber 43 becomes effective, and the leakage will build up the pressure therein, as well as in the open cylinder below the piston.

In the illustrated embodiment, the size of each shift chamber is such that, even at low air pressures, the piston 28 will be moved at least slightly over halfway to the opposite operating position under the described circumstances. At this point in the operation, the second air supply means comes into play. Broadly, this consists of a unique passage means, whereby additional air is automatically supplied to the unvented end of the cylinder in a manner to insure that the piston completes its stroke without intermediate delay.

To this end, I provide in the peripheral face of piston 28 a short transverse channel 47 located a short distance above the upper edge of the recess 29 at the side of the piston, which faces inlet port 17. Extending upwardly from this transverse channel and opening to the cylinder above the piston is a longitudinal groove 48.

A corresponding transverse channel 49 and longitudinal groove 50 are provided below recess 29; in this case, the groove 50 opens to the cylinder below the piston 28. The dimensions of grooves 48 and 50 are not critical, though their cross sections should be enough smaller than the shift chambers' vent passages described below, that the pressure at the vented end of the cylinder may be reduced substantially to atmospheric pressure.

Transverse channels 47, 49 are so located that, before the piston travelling toward the vented end of the cylinder reaches a point, where the thrust due to the trapped compressed air would become ineffective to move the piston further, the channel which is closer to the vented end of the cylinder is blanked by the cylinder wall, while the other channel comes into register with inlet port 17. The additional air thus admitted to the unvented end of the cylinder completes the stroke of the piston.

To illustrate the mode of operation of this arrangement, the manner in which the piston is shifted from the lower operating position shown to the upper operating position will now be described. As will be pointed out below, during the time that the drive piston D is moving through its work stroke, neither end of the cylinder is vented. With the piston 28 in its lowermost position, air from inlet port 17 accumulates in the lower shift chamber 42, because of the smaller diameter of the piston 28 in relation to the diameter of the cylinder 11. On the other hand, upper shift chamber 43 remains filled with air, as said chamber is communicated with the inlet 16 by both the longitudinal groove 48 and the clearance between the piston 28 and the cylinder wall 9.

As will be pointed out in detail, when the drive piston D reaches the bottom of its stroke, the upper end of the cylinder 11 will be vented to atmosphere through passageways which are so large that air cannot leak between the piston 28 and the cylinder wall 9 and through the groove 48 fast enough to fully replace it. Therefore, the pressure of the air accumulated in shift chamber 42 pushes the piston 28 upwardly. As soon as the piston 28 has moved slightly over halfway to the upper operating position, the upper edge of transverse channel 49 clears the lower face 17b of recess 17 and an additional flow of air is supplied to the lower end of the cylinder 11, giving the piston 28 an additional push upwardly into its upper operating position. The piston 28 is shifted back to the lower position in a correlative manner.

As can be seen from the above description, the transverse channels 47 and 49 each perform an important function. They each provide a wide inlet to their respective longitudinal groove 48 or 50, since each has a shape, which is the complement of the respective edge of recess 17. Therefore, even though the accumulated air in the particular shift cavity 42 or 43 only pushes the piston 28 sufficiently that the edge of the transverse channel barely clears the upper or lower transverse edge of recess 17, a full flow of air is supplied to the respective longitudinal groove, and thence to the corresponding end of the cylinder 11. Such structure has the additional advantage that ice, formed because of moisture in the air, does not tend to clog it.

Turning now to the manner in which the upper and lower ends of the cylinder 11 are vented, it will be seen that cylindrical control rod R extends vertically up through bore 52 in the top of the casing C and into barrel 53 in the housing 10. O-rings 54, 54a, and 54b seal against the rod R in a conventional manner. The control rod R is attached to the drive piston D and, therefore, the rod will move from its upper position shown in FIGURE 2 to the lower position shown in phantom lines, as the piston D is moved to its position at the lower end of the work stroke.

At a point spaced below the upper end of the rod R a distance equal to the work stroke, the rod is tapered at 55 and 56 on either side of reduced diameter cylindrical section 57. Extending axially between the tapered portions 55 and 56 are four angularly spaced slots or recesses 58, which may, for instance, be of "half moon" configuration, as illustrated by dotted lines in FIGURE 2.

An O-ring 65 is located in annular recess 66 in the wall of the barrel 53 at a point adjacent to the tapered portion 56, when the rod R is in the upper position. The O-ring 65 is standard and, therefore, when unstressed has an inside diameter which is substantially the same as the full diameter of the rod R. Therefore, with the rod R in the position shown in FIGURE 2, there is annular clearance between the O-ring 65 and the reduced diameter portion 57 of the shaft; and the lower end of the cylinder 11 is vented through a vent passage P comprising passage 60, the registering annular cavity 61 in the barrel wall, the annular space between rod portion 57 and the O-ring, and exit passage 62. This arrangement provides a venting control, which closes the vent passage so that no air may leak from below the piston 28 until the proper time, whereupon the control "snaps open".

The mode of operation of this venting control may be seen by assuming that the drive piston D is at any intermediate position of its work stroke moving upwardly. At this time, the piston 28 would be in the upper position, because of pressure below it, while vent passage P is sealed off, because a full diameter portion of rod R is embraced by O-ring 65. As can be seen, the annular cavity 61 extends into the upper side of the channel 66. Therefore, as the rod R is moved upwardly, pressure below the piston 28 is communicated with the outside of O-ring 65 pushing it against the rod R. As tapered portion 56 passes through the O-ring 65, this pressure shrinks the O-ring on the tapered portion, thus maintaining the seal.

FIGURE 8 illustrates the situation just before the lower edge of the tapered portion 56 is moved upward of the O-ring 65. At this time, there is no venting flow from the lower end of the cylinder 11, because the stressed O-ring 65 still maintains a seal. However, as the rod R moves slightly above the position shown in FIGURE 8, the upper ends of the recesses 58 pass through and above the O-ring, breaking the seal, whereupon the O-ring 65 "snaps" back to its normal position in the annular channel 66. At this point, the air is through passage 8 vented very rapidly from the lower end of the cylinder 11 and the piston 28 shifts to its lowermost position, as shown in FIGURE 2. This reverses the travel direction of drive piston D and rod R.

As illustrated in phantom lines in barrel 53, the accumulated pressure is vented from the upper end of the cylinder 11 in a similar manner. The upper end of control rod R is tapered at 67, the direction of inclination being opposite that of taper 56, and terminates in a reduced diameter cylindrical section 68, which has four longitudinal recesses 69 formed therein. Around the rod R is an O-ring 70, retained in annular recess 70a in the manner described in connection with ring 65 and recess 66. The association of ring 70, recess 70a, rod portion 68, cavity 73, and slots 69 is the same as that explained in connection with ring 65, recess 66, rod portion 57, cavity 61, and slots 58, respectively. Therefore, as the rod R approaches the lower end of its stroke, pressure in the upper end of the cylinder 11, acting through vent passage P', comprising passages 71 and 72 and annular cavity 73, shrinks O-ring 70 around tapered portion 67.

When the upper end of the tapered portion 67 passes downwardly through the O-ring 70, the axial recesses 69 will break the seal, allowing the stressed O-ring 70 to "snap" back to its normal diameter and position. At this point, the air in the upper end of the cylinder 11 will be vented through passages 71 and 72 to annular cavity 73, from which point it will flow upwardly through barrel 67 and through screen 74 to atmosphere. This allows air in the lower shift cavity 42 to thrust the piston 28 to its upper operating position.

The entire apparatus operates in the following manner. Before the hand valve H is opened, normally the drive piston D will be at some intermediate position, while the valve piston 28 will have gravitated to its lowermost operating position. When air is supplied through inlet 16, upper drive chamber U will be pressurized through conduit T, while lower drive chamber L will be vented through conduit K to atmosphere, causing piston D and control R to move downwardly. When the control rod R reaches its lowermost position, the O-ring 70 "snaps open," as described above, venting the upper end of the cylinder 11, whereupon the accumulated air in shift 42 moves the piston 28 upwardly sufficiently that transverse channel 47 is blanked and transverse channel 49 is opened to the inlet port 17. This gives an additional supply of air to the shift chamber 42, insuring that the piston 28 is forced to its upper operating position.

At this stage, air will be supplied from inlet 16 around recess 29 to port 20 to pressurize lower drive chamber L, while the upper drive chamber U is vented. As the piston D is moving upwardly, the shift chamber 43 is not vented and, therefore, air may accumulate in this chamber by leakage between the piston 28 and the valve cylinder wall 9. By the time the drive piston D reaches its upper position and O-ring 65 "snaps open," sufficient air has accumulated in chamber 43 to initiate the thrust of valve piston 28 to its lower operating position. As soon as the valve piston has reached its lowermost position with the aid of channel 47 and groove 48, the cycle is repeated.

While only one form of the invention has been shown and described in detail, it will be apparent to those skilled in the art, that such is by way of example only and that numerous changes and modifications may be made to the embodiment shown without departing from the spirit of this invention. Therefore, it is my intention that this invention be limited solely by the scope of the appended claims.

I claim:

1. A cylindrical piston for an actuator valve of a work device, said piston having a circumferential recess intermediate the ends thereof, said piston having passage means sunk in the peripheral face thereof and extending from a point at one side of the recess to the corresponding end of the piston, the piston also having a second passage sunk in the peripheral face thereof and extending from a point at the other side of the recess to the other end of the piston.

2. A cylindrical piston for an actuator valve of a work device, said piston having a circumferential recess intermediate the ends thereof, said recess being of varying cross sectional area as between given angular extent thereof, said piston having a passage means sunk in the peripheral face thereof and extending from a point at one side of the recess to the corresponding end of the piston, said passage means being in radial alignment with the portion of the said recess which has the largest cross sectional area.

3. A cylindrical piston for an actuator valve of a work device, said piston having a circumferential recess intermediate the ends thereof, said recess being of varying cross sectional area as between angular extent thereof; a short transverse channel formed in a peripheral wall of the piston adjacent to, but spaced from said recess; a first groove formed in the peripheral wall of the piston extending from said channel longitudinally to the adjacent end of the piston.

4. A piston as set forth in claim 3, wherein said recess extends around the piston midway of its length; a second transverse channel as formed in the correlative position at the side of the recess opposite that occupied by said first mentioned channel; and a longitudinal groove extends from said second channel to the adjacent end of the piston.

5. An actuator valve for alternately pressurizing and venting a first and a second drive chamber in order to cause a work device to operate, said actuator valve comprising: a housing having a vertical cylinder formed therein; means forming an inlet for receiving pressurized fluid into the cylinder through one side of the cylinder wall; means forming a first delivery port in said cylinder wall and communicating said port with said first chamber; means forming a second delivery port in said cylinder wall spaced axially with respect to the cylinder from said first port and communicating said second port with said second chamber; exhaust port means opening through said cylinder wall and communicating with the atmosphere; a valve piston in said cylinder, said piston being slidable between an upper position and a lower position, said piston having circumferential recess means therein for conducting fluid between said piston and said cylinder wall from said inlet to said first port, when said piston is in the lower position and to said second port, when the piston is in the upper position, said recess means forming a venturi section on the side of the piston facing said first and second ports; passage means in said piston for communicating said exhaust port means with said second port, when said piston is in the lower position and with said first port, when the piston is in said upper position; and means cooperating with said cylinder and piston for moving said piston alternately between said lower and upper positions.

6. An actuator valve for alternately supplying pressurized fluid to a first and a second drive chamber of a work device, said actuator valve comprising: a housing having a vertical closed cylinder formed therein with a cylindrical side wall; means forming an inlet for receiving pressurized fluid into said cylinder through the side wall of said cylinder; means forming a first delivery port in said cylinder wall, said last mentioned means being adapted to communicate said port with said first chamber; means forming a second delivery port in said cylinder wall, said last mentioned means being adapted to communicate said second port with said second chamber; a valve piston in said cylinder and slidable between an upper position and a lower position, said piston being of smaller diameter than said cylinder to permit leakage of pressurized fluid from said inlet to both the upper and the lower ends of the piston, whereby leaked fluid accumulates in respective shift chambers formed between the cylinder and the respective ends of the piston; a passageway in said piston communicating with the lower end of said piston, the upper end of said passageway being located so that it is registered with the inlet only after the piston has moved upwardly a predetermined distance; circumferential recess means formed at least partially by said piston for conducting pressurized fluid at a rapid rate between the piston and the cylinder wall from said inlet to said first port, when said piston is in its lower position and to said second port, when said piston is in its upper position, said recess means having a diminished cross section for flow on the side of the piston facing the first and second ports; and means communicating with said shift chambers for alternately venting the accumulated pressurized fluid to cause movement of the piston toward the particular vented end under the influence of pressurized fluid in the respective unvented end.

7. The actuator valve set forth in claim 6, wherein said passageway is formed in the peripheral face of the piston and is in radial alignment with said inlet.

8. An actuator valve for a work device comprising: a housing having a cylinder formed therein with its axis extending in a first direction, said cylinder being closed at its opposite ends; means forming an inlet adapted to receive pressurized fluid into said cylinder through the side wall of the cylinder, said inlet having two defining faces, which extend generally transversely with respect to said first direction; a first and a second delivery port opening through said wall into said cylinder, said ports being axially spaced apart; a valve piston in said cylinder and axially slidable between a first operating position at one end of said cylinder and a second operating position at the other end of said cylinder; means on said piston to conduct pressurized fluid from said inlet to said first port, when said piston is in said first operating position and from said inlet to said second port, when said first piston is in said second operating position; a transverse channel formed in said piston adjacent to, but spaced from said recess toward one end of said cylinder, said channel being radially aligned with said inlet, the edge of said channel nearest said recess having a shape which is the complement of the inlet transverse defining face nearest said one end of said cylinder; and passage means on said piston for conducting fluid from said channel to said one end of the cylinder, whereby fluid may flow from said inlet to said one end of the cylinder, when the piston has moved sufficiently toward said second operating position to register said transverse channel with said inlet.

9. In combination with a work device having a first and a second drive chamber, which are expanded and contracted by being pressurized and vented alternately to reciprocate the device through its work stroke, said device having a control rod, which is positioned by movement of the device through its work stroke, an actuator valve comprising: a housing having a closed cylinder formed therein; a pressurized fluid inlet opening into said cylinder through the cylindrical wall at a first side thereof; a first delivery port opening into said cylinder through the cylindrical wall thereof at a second side thereof opposite said first side; a second delivery port opening into said cylinder through the cylindrical wall thereof at said second side; conduit means communicating said first port with said first drive chamber and said second port with said second drive chamber; a valve piston located in said cylinder and forming with said cylinder a first shift chamber at one end of the cylinder and a second shift chamber at the other end of the cylinder, said piston being slidable between a first operating position at said one end of the cylinder and a second operating position at said other end of the cylinder, said piston having passage means for conducting fluid from said inlet to said first port, when said piston is in said first operating position and from said inlet to said second port, when said piston is in said second operating position, said piston having means thereon which urges the piston against the wall of said cylinder at said second side thereof, said urging means being effective only when pressurized fluid is flowing through said passage means, said piston being shaped to allow pressurized fluid to leak from said inlet to said shift chambers; and venting means cooperating with said control rod to vent to atmosphere the fluid in said first shift chamber, when said second drive chamber is substantially completely expanded and to vent to atmosphere the fluid in said second shift chamber, when said first drive chamber is substantially completely expanded.

10. The apparatus set forth in claim 9, wherein a short transverse channel is formed on said piston adjacent to the passage means, but spaced from said passage means toward said one end of the cylinder, said channel facing said inlet; and an axial groove is formed in said piston communicating fluid in said channel with said first shift chamber.

11. The apparatus set forth in claim 9, wherein said passage means comprises a circumferential recess extending around the piston at a point intermediate the ends thereof, said recess being of less cross sectional area on the side of the piston facing said delivery ports than on the opposite side of the piston.

12. In combination with a work device having first and second drive chambers, which are expanded and contracted by being pressurized and vented alternately to reciprocate the device through its work stroke, an actuator valve comprising: a housing having a cylinder; a pressurized fluid inlet opening into said cylinder; a first delivery port opening to said cylinder at a side thereof opposite said inlet opening; a second delivery port opening to said cylinder at the same side as said first port; fluid conducting means communicating said first port with said first drive chamber and said second port with said second drive chamber; a valve piston in said cylinder and forming, with said cylinder, a first shift chamber at one end of the cylinder and a second shift chamber at the other end of the cylinder, said piston being slidable between a first operating position at said one end of the cylinder and a second operating position at said other end of the cylinder, said piston having passage means for conducting fluid from said inlet to said first port, when the piston is in said first operating position and from said inlet to said second port, when said piston is in said second operating position, said piston having means thereon, which urges the piston against the peripheral cylinder wall at the side of said cylinder through which said first and second ports open, said urging means being effective only when pressurized fluid is passing through said passage means, said piston being shaped to allow pressurized fluid to leak from said inlet to said shift chambers; a barrel formed in said housing; a conduit leading from said first chamber to an outlet in said barrel; an annular recess in the wall of said barrel, said recess communicating with said outlet at all times; an O-ring of predetermined internal diameter being located in said annular recess; a control rod slidable within said barrel and connected to said work device to be positioned by movement of said work device through its work stroke, said rod having a portion of said predetermined diameter and a relatively reduced diameter portion, said portions being joined by a tapered portion, said reduced diameter portion having at least one axial groove terminating near the juncture of said reduced diameter and tapered portions, said reduced diameter and tapered portions being located on said rod so, as said second drive chamber is expanded, the first named portion of the rod passes through said O-ring ahead of the tapered portion, whereby the pressure of the fluid in said first shift chamber shrinks said O-ring about the tapered portion to maintain a seal until said axial groove passes through the center of the O-ring a sufficient distance to break the seal, whereupon said O-ring snaps back to its orignial position within the said recess; and means for conducting said fluid from the barrel space defined by said reduced diameter portion to atmosphere.

13. An actuator valve for a work device comprising: a housing having a cylinder formed therein with its longitudinal axis extending in a first direction, said cylinder being closed at its opposite ends; means forming an inlet port in the side wall of said cylinder; means forming a first delivery port in the side wall of said cylinder, said first delivery port being longitudinally spaced in said cylinder from said inlet port; means forming a second delivery port in said cylinder, said second delivery port being longitudinally spaced in said cylinder from said inlet port and said first delivery port; a valve piston longitudinally movable in said cylinder between first and second operating positions and cooperable with said cylinder to define first and second shift chambers at the respective ends of said piston, said piston having a circumferential recess intermediate its ends for conducting fluid from said inlet port to said first delivery port, when said piston is in its first operating position and from said inlet port to said second delivery port, when said piston is in its second operating position, said piston having passage means sunk in the peripheral face thereof extending from a point at the side of said recess adjacent the first end of the piston to said first end and adapted to provide fluid communication from said inlet port to said first shift chamber, said first passage means being substantially blocked in the first operating position of said piston and being unblocked during movement of said piston from said first toward said second operating position to permit such communication; and means operatively associated with said shift chambers for alternately venting said shift chambers.

14. An actuator valve for a work device comprising: a housing having a cylinder formed therein with its longitudinal axis extending in a first direction; means forming an inlet port in the side wall of said cylinder; means forming a first delivery port in the side wall of said cylinder, said first delivery port being longitudinally and radially spaced in said cylinder from said inlet port; means forming a second delivery port in said cylinder, said second delivery port being longitudinally and radially spaced in said cylinder from said inlet port and longitudinally spaced in said cylinder from said first delivery port; a valve piston longitudinally movable in said cylinder between first and second operating positions, said piston having a circumferential recess intermediate the ends thereof for conducting fluid from said inlet port to said first delivery port, when said piston is in its first operating position and from said inlet port to said second delivery port, when said piston is in its second operating position, said recess being of varying cross sectional area as between given angular extent thereof with a maximum-area portion of said recess in radial alignment with said inlet port, when said piston is in its first operating position and when said piston is in its second operating position; and means cooperating with said cylinder and piston for moving said piston alternately between its first and second operating positions.

References Cited in the file of this patent

UNITED STATES PATENTS

| | | |
|---|---|---|
| 225,677 | Winters | Mar. 16, 1880 |
| 1,892,187 | Drennon | Dec. 27, 1932 |
| 2,105,473 | Dean | Jan. 18, 1938 |
| 2,623,501 | Audemar | Dec. 30, 1952 |
| 2,750,929 | Bronson | June 9, 1956 |